United States Patent [19]

Kister et al.

[11] 4,406,007
[45] Sep. 20, 1983

[54] CIRCUIT ARRANGEMENT FOR TIME DIVISION MULTIPLEX DATA TRANSMISSION WITH A BUS SYSTEM

[75] Inventors: Horst Kister, Wehrheim; Horst Ullrich, Schöneck, both of Fed. Rep. of Germany

[73] Assignee: VDO Adolf Schindling AG, Fed. Rep. of Germany

[21] Appl. No.: 313,917

[22] Filed: Oct. 22, 1981

Related U.S. Application Data

[62] Division of Ser. No. 35,003, May 1, 1979.

[30] Foreign Application Priority Data

May 31, 1978 [DE] Fed. Rep. of Germany ....... 2823708
Jul. 7, 1978 [DE] Fed. Rep. of Germany ....... 2829839

[51] Int. Cl.³ .............................................. H04J 3/14
[52] U.S. Cl. ........................................ 370/85; 370/16; 370/13
[58] Field of Search ............... 370/85, 16, 17, 86, 370/88, 13

[56] References Cited

U.S. PATENT DOCUMENTS

| | | | |
|---|---|---|---|
| 2,064,906 | 12/1936 | Green | 370/86 |
| 3,624,304 | 11/1971 | Formenti | 370/51 |
| 4,024,501 | 5/1977 | Herring | 370/85 |
| 4,129,750 | 12/1978 | Mattern | 370/16 |
| 4,156,106 | 5/1979 | Bumgardner | 370/85 |
| 4,156,112 | 5/1979 | Moreland | 370/85 |
| 4,245,342 | 1/1981 | Entenman | 370/16 |

*Primary Examiner*—Douglas W. Olms
*Attorney, Agent, or Firm*—Eric P. Schellin

[57] ABSTRACT

An arrangement is disclosed for time division multiplex data transmission with a bus system which includes a bus line and a plurality of participators connected to the bus line in data transmitting connection with each other in a predetermined succession in a predetermined combination, in which each participator has at least one programmable counter having a counting input for connection with a synchronizing signal generator and an output for connection with a switching device to produce a data transmitting connection between the bus line and a data source or sink of this participator, whereby the counters of all participators are synchronized with each other. The arrangement includes apparatus to detect short circuits and to shut down individual sections of the bus line to protect the individual sections without shutting down all sections.

2 Claims, 5 Drawing Figures

CIRCUIT ARRANGEMENT FOR TIME DIVISION MULTIPLEX DATA TRANSMISSION WITH A BUS SYSTEM

This is a division of application Ser. No. 035,003, filed May 1, 1979.

BACKGROUND OF THE INVENTION

The invention relates to an arrangement for time division multiplex data transmission with a bus system which includes a bus line and a plurality of participators connected to the bus line which are in data transmitting connection with each other in a predetermined succession in a predetermined combination, in which preferably each participator has at least one progammable counter, the counting input of which is connected with a synchronizing signal generator and the output of which is connected with switching means to produce a data transmitting connection between the bus line and a data source or sink of this participator, whereby the counters of all participators are synchronized with each other according to Patent application No. P 27 50 818.5-31.

In known series bus systems, data can be transmitted in a predetermined order between respective given participators on a bus line, which can include a data conductor and an energy source. Even if all participators connected to the bus conductor are always ready to respond, only one participator or a certain group of participators can receive the respectively transmitted data for further processing.

To select this participator or a certain group of participators, according to the prior art an address signal is transmitted which only allows the desired other participators or desired other group of participators to transmit the information for further processing in this participator. The end of this transmission is indicated by an end signal on the bus line, which causes the next participator or group of participators to send their information with preceeding address signal and subsequent end signal. This type of known arrangement for series or time division multiplex data transmission can be built to transmit analog signals and/or so-called discrete signals, which only contain yes/no information.

In this type of bus system, in order to improve the relative time period in which the bus system is available for transmitting actual useful information in relation to the total time period of the transmission, which includes the transmission of the address signals and end signals, according to Patent application No. P 27 50 818.5-31 it has already been proposed that each participator have at least one programmable counter which gives a control signal at a programmed number and which is reset to zero after reaching a predetermined counting capacity, which is the same for all counters; that a counting input of the counter is connected with a synchronizing signal generator; that a first control output of the counter is connected with switching means for producing the data transmitting connection between the bus line and a data source or sink of this participant; and that the counters of all participators are synchronized with each other.

According to the above mentioned patent, a measure is also taken so that even during a short circuit in one or more transmitting output stages of the participator there is sufficient signal deviation or swing on the bus conductor, which can be evaluated by the participators operating as receivers. For this purpose, the transmitting output stages of the participator are connected to the bus line by means of resistors.

According to this arrangement, however, the bus system is only protected against breakdown in special cases of short circuits, namely short circuits in the transmitting output stages.

SUMMARY OF THE INVENTION

The basic objective of the present invention is to create an arrangement for time division multiplex data transmission with a bus system of the type described in the above-mentioned patent application, which is protected against a broader range of short circuits, so that the entire bus system does not break down as a result of a short circuit.

This objective is achieved according to the invention, by providing an arrangement for time division multiplex data transmission with a bus system of the type disclosed above, wherein the bus conductor is secured by means to detect short circuits and shut down individual sections of the bus conductor.

Thus, in an advantageous manner, the conductor sections which are themselves disturbed by a short circuit or which are connected with participators in which a short circuit appears at any location, are disconnected from the bus system, so that the remaining bus system remains functional as before. Only the section of the bus line with the connected participator in which a malfunction, such as a short circuit, appears is shut down.

A particularly effective, and simple realization of the apparatus to secure the bus line comprises arranging a resistor for limiting short circuits between the bus line and a participator.

Similarly, and also inexpensive, is an apparatus having the characteristic that a resistor to limit short circuits is arranged between two sections of the bus line.

In both above-mentioned cases, the resistor to limit serves as a protecting resistor in the case of a short circuit, whereby an extensive disconnection of the short-circuited participator or short-circuited sections of the bus line occurs automatically, because the short circuit automatically causes a higher short circuit current and thereby the voltage potential drop in the resistor. This causes the level of the signals on the data conductor to decrease or drop, but the remaining bus system is still fully functional, so long as there are not too many short circuits simultaneously.

The resistor which causes the shut down or disconnection of the malfunctioning participator or malfunctioning section of the bus line can in one variation effectively be formed as a discrete resistor. In this case, the structure of the bus system, particularly the bus line, remains practically unchanged and is only expanded with the discrete resistor at given locations.

In a second variation, individual sections of the bus line can themselves consist of resistor wire. In this case, the addition of discrete resistors is superfluous, because the voltage potential drops occur in the sections of the bus conductor itself to disconnect the malfunctioning sections or participators in the case of a short circuit.

In an effective further development, the resistor can have a resistance value which increases as the current increases. The short circuit current can thus be lowered in an advantageous manner so that the transmitting participators are not heavily loaded. However, with this form of the invention, the disadvantage can occur that the minimum allowable signal level on the bus line, namely the data line, is reached sooner than with resistors having constant resistance value and that a short circuit to an energy line of the bus line cannot under certain circumstances be protected against.

With a star-shaped structure of line sections connected to the bus line, with which line sections participators are connected, it is recommended to arrange the resistors in the vicinity of the star points.

In a particularly advantageous embodiment of the invention, means are provided to detect short circuits and shut down individual sections of the bus line, including a level sensor connected to the bus system to detect level fluctuations on a data line of the bus line as a participator, and each line section to be shut down can be turned off centrally by the level sensor in any data transmission cycle by means of an overload switch having a control circuit arrangement formed as a participator, and can be turned on in accordance with a turn-on command transmitted by the level sensor in a subsequent data transmission cycle and in accordance with electrical values of the respective line section evaluated in the control circuit arrangement.

This arrangement is especially advantageous in a bus system which has a protected core system with non-disengageable participators and further line sections which are relatively more endangered by crashes of a vehicle in which the system may be used, for example. The level sensor to detect level fluctuations is in this case advantageously connected in the core system to the data line of the bus line. Both the level sensor and the overload switch are in the present case participators of the bus system in which data is transmitted in successive data transmission cycles. In the case in which a level change exceeds a given allowable measure determined by the level sensor, all overload switches are immediately commanded to turn off the associated line section by means of preferential command transmission. This takes place independently of whether the respective conductor section turned off by the overload switch is malfunctioning or not. In the next data transmission cycle the level sensor gives a turn-on command to all overload switches because it recognizes the signal level of the bus line in the core system as being free from malfunctions. But only those overload switches turn their associated line sections back on which, according to the electrical values evaluated in the control circuit arrangement of the overload switch, give information signalling a short circuit in the respective line section. By turning off all line sections endangered by a crash, the section actually malfunctioning is safely detected. The participators connected to the core system of the bus system which are not connected by means of an overload switch remain functional. The overload switches which secure the participators in the core system can disengage both short-circuited lines as well as lines of the core system. For a line which is connected at two ends to the bus system, an overload switch is necessary at each end, while for a line which is only connected to the bus system on one end, only one overload switch is necessary.

This safety system largely eliminates the effects of short circuits on the data line of the bus line, because only those participators are shut down which are connected to short-circuited line sections. Even a large number of short circuits in the disconnectable line sections will not result in failure of the entire bus system. The signal voltage levels in the rest of the bus system are not affected by short circuits in any disconnectable line sections. Above all, all of the signal bus system which must be specially protected, such as the level sensor, a participator for a steering booster and a participator for a power brake, remain fully functional in the core system.

One preferred embodiment of the preceding arrangement is equipped with the following characteristics: a control circuit arrangement is provided in the overload switch to measure resistance between the data line and a ground line to form a control signal and the control signal as well as the turn-on command can be joined in a logic circuit to form a turn-on signal which can be put into the line section. When a level fluctuation is detected by the level sensor, a turn-on signal is thus transmitted to turn on a shut down line section when this level sensor again transmits a turn-on command and when the control circuit arrangement has determined that there is no short circuit by measuring the resistance in the disconnectable line section. Thus, a ground short circuit is detected for the switch decision of the overload switch.

In a particularly effective further development of the invention, it is provided that the control circuit arrangement of the overload switch is also equipped to evaluate the polarity of the voltage on the data line, which can be disconnected by the overload switch, with regard to an energy source and to produce a control signal in dependence on the polarity, which can be joined with the turn-on command of the lever sensor in the logic circuit arrangement to form a turn-on signal.

In this further development, the fact is taken advantage of that the signal voltage level on the data line of the bus line is normally always smaller than the positive battery potential prevailing on an energy line of the bus line. The polarity of the voltage between the data line and the energy line on the overload switch is in this case a criterion for a short circuit to the energy line, and by the logic joining the turn-on command transmitted by the level sensor, this leads to a switch decision of the overload switch. Only when the voltage has a polarity indicating normal operating conditions is a turn-on signal transmitted to the switch of the overload switch.

When a ground short circuit occurs, the voltage between the data line and the energy line has a reversed polarity, and in this case, as described above, the resistance between the data line and ground is evaluated with the turn-on command transmitted from the level sensor to form the switch decision. The control circuit arrangement having means to evaluate the polarity thus also allows recognition of short circuits of the data line to the current supply line and safeguards the bus system from such a malfunction.

In an advantageous manner, the energy line itself can also be protected by the overload switch, in that a switch contact is arranged in the energy line which is activated by the turn-on signal. When the short circuit safeguard is released by the overload switch, the current supply to the participator of the shut-down line section is interrupted. It is helpful in this regard if the participator is built in such a manner that it goes to the off position when it receives insufficient energy.

In detail, the arrangement which makes it possible for disturbed line sections to be turned off in the above-mentioned instances of malfunction is effectively provided with the characteristics that a switch is arranged in each energy line and in the data line in the overload switch, that a connection of a terminal of the switch in the energy line which is connected with the energy source leads to the control circuit arrangement, and that a connection of a terminal connected with the level sensor and a terminal of the switch in the data line connected with the disconnectable line section leads to the control circuit arrangement.

In order that this arrangement can remain functional even when there are short circuits of the energy line to the ground, it is also distinguished effectively by a safeguard in the energy line on the side of the overload switch connected with the energy source.

According to a further concept of the invention, individual lines of the bus line are each connected to a central bus line, to which an energy source is connected, by way of a safety device. In this manner, when one or more short circuits occur at any location of the bus system—even in the central portion—as few other portions of the bus system are shut down as possible.

With this arrangement of time divisional multiplex data transmission only as many safety devices are necessary as there are lines leading away from the central bus line. And thus when a short circuit occurs in one line, no other line is caused to suffer as well. Only when a short circuit occurs in a section of the central bus line can the lines connected to this section also be disturbed.

It should be noted at this point that by central bus line is meant that section of the bus line from which all other sections branch off. The central bus line is preferably located in a crash-proof core system. By a line of the bus line is meant a section connected with one end to the central bus line.

For a particularly clear arrangement of the bus system it is further effectively provided that the safeguards at each end of the central bus line, from which the lines branch off, are joined together in a safety module.

A particularly advantageous variation has the characteristics that: instead of the central bus line as central portion, a central participator module is provided having at least one safety module directly connected therewith; each line is connected with the participator module by way of a safety device in the safety module; and the energy souce is directly connected to the participator module.

With this configuration, no short circuits can occur in sections of a central bus line, because the lines lead directly away from a central participator module by way of a safety module. Thus, only the actually disturbed section or line of the bus system fails.

DETAILED DESCRIPTION OF THE PREFERRED EMBODIMENTS

Figure 1:
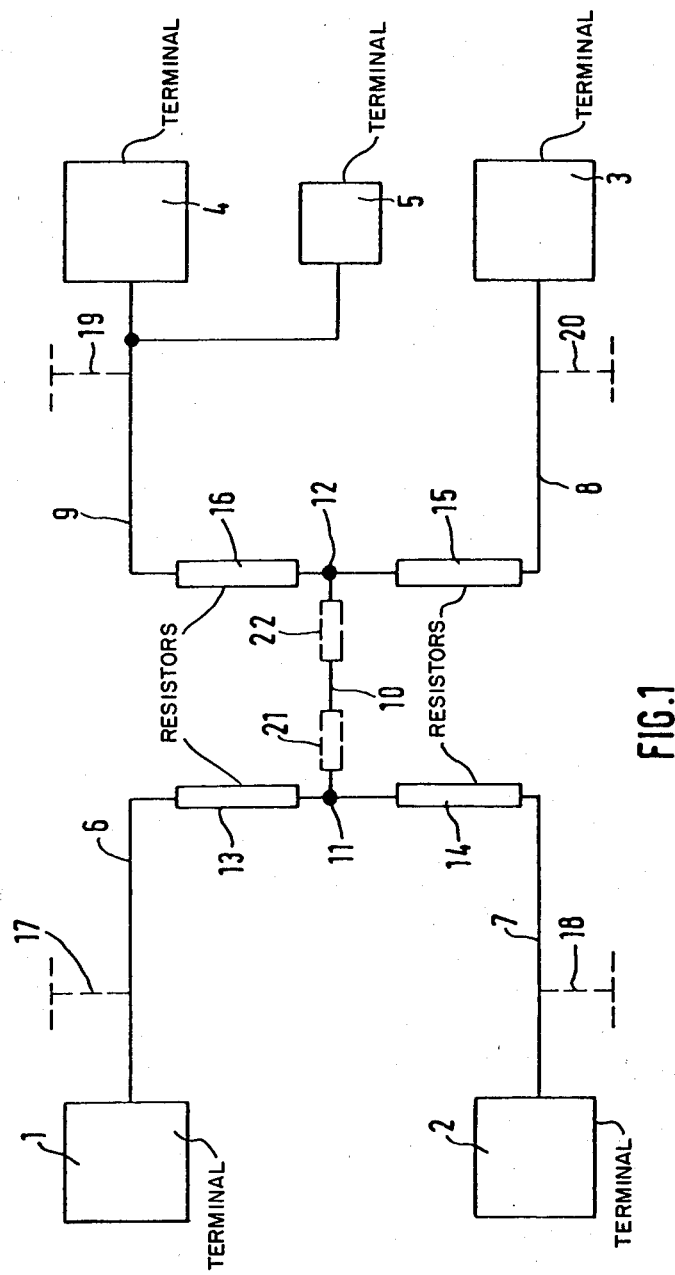
FIG. 1 is a diagrammatic circuit arrangement for partial security with resistors.

In FIG. 1, numerals 1 through 5 designate participators of a bus system which are arranged in crash-vulnerable zones. Each participator 1,2 and 3 and the participators 4 and 5 together are connected to a central bus line 10 arranged in a non-crash-vulnerable core system by means of line sections 6,7,8 and 9 of a bus line.

Resistors 13 and 14 are arranged respectively between the common connections point 11 and the line section 6, and between the connection point 11 and the line section 7, in the vicinity of the connection point. Similarly, a resistor 15 is arranged between the central connection point 12 and the line section 8 and a resistor 16 is arranged between the connection point 12 and the line section 9. Each resistor is connected in the vicinity of the connection point so that as large a portion of the line sections 6,7,8 and 9 as possible are included in the case of a short circuit.

If a ground short circuit of line section 6 occurs at a point 17, there will be a voltage drop at the resistor 13 which is almost the same as the voltage prevailing on the central bus line 10. The short circuit current resulting from the ground short circuit at point 17 is thus limited by the resistor 13, so that the voltage level on the central bus line 10 sinks, but not so far that the participators 2,3,4 and 5 are no longer functional.

Only the participator 1 becomes disfunctional. In particular, participators not shown in the drawings, which are directly connected to the central bus line 10, can in this manner remain functional.

The entire bus system shown in FIG. 1 can also then function at a lower voltage level on the bus line 10 even if such a ground short circuit occurs at a second or further point 18,19 or 20 of possible ground short circuits.

In FIG. 1, the resistors 21 and 22 shown by interrupted lines, indicate that even the central bus line 10 can be secured partially by current limiting resistors.

In place of the discrete resistors illustrated in FIG. 1, individual line sections can be made of resistor wire.

The diagrammatically illustrated line in FIG. 1 is the data line of the bus system.

Figure 2:
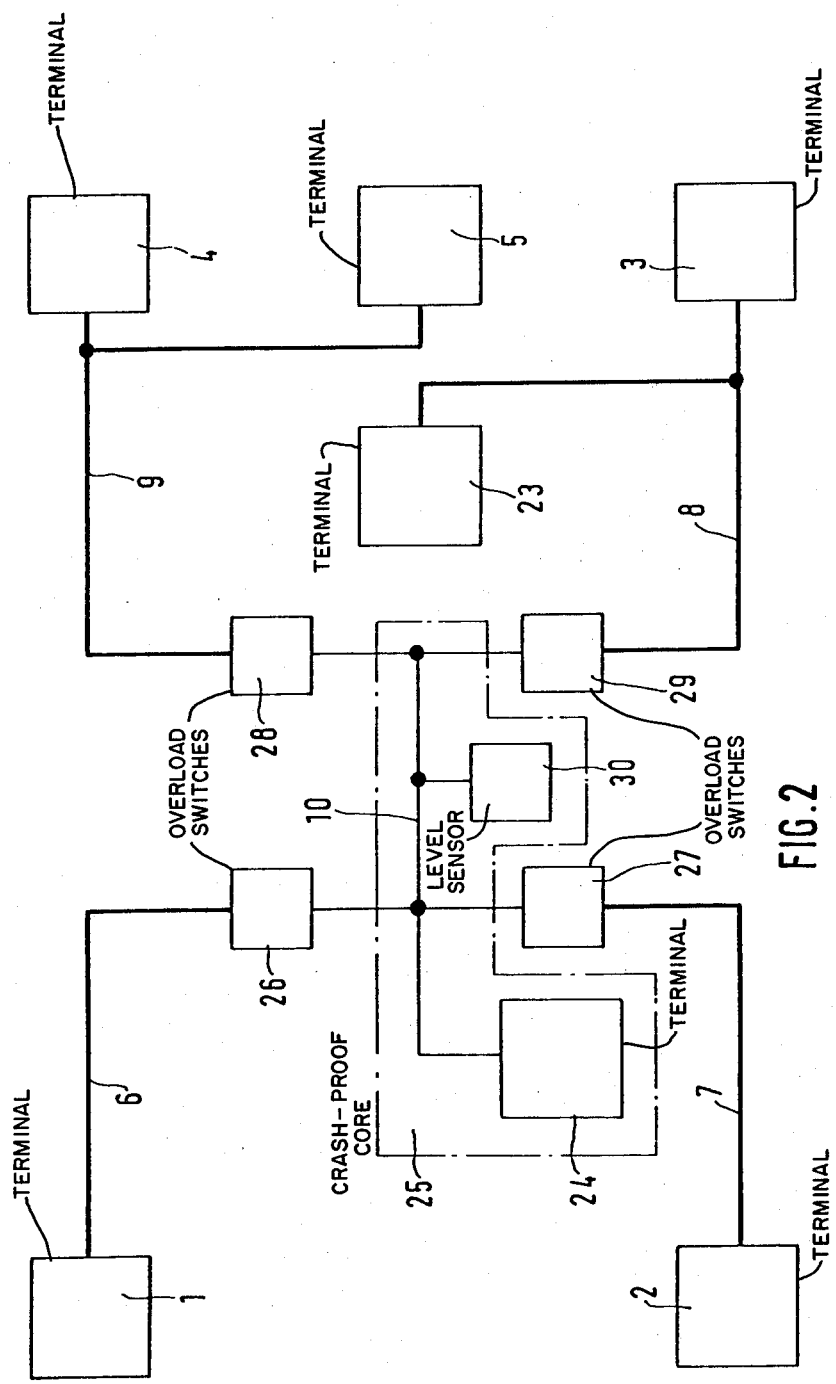
FIG. 2 is a diagrammatic circuit arrangement for partial security of particularly endangered participators with overload switch and a level sensor.

The bus system according to FIG. 2 largely corresponds to that in FIG. 1, with the participators 1,2,3,4 and 5 connected by line sections 6,7,8 and 9 to a central bus line 10. In addition to the system shown in FIG. 1, a further participator 23 is also connected with the line section 8 and a further participator 24 is directly connected to the central bus line 10. The participator 24 and the central bus line 10 lie in a crash-proof core system 25, which is indicated by a dot-and-dash line.

The line sections 6,7,8 and 9 are coupled with the central bus line 10 by overload switches 26,27,28 and 29 instead of by resistors. These overload switches form participators of the bus system. A level sensor 30 is also connected to the central bus line 10 within the core system 25; and the level sensor is also a participator of the bus system.

The crash-endangered line sections 6,7,8 and 9, shown with thicker lines, are protected toward the core system by means of the overload switches. The protection takes place in that all overload switches disconnect their associated line sections from the core system when the signal level on the central bus line 10 sinks below a certain minimum value—in the extreme case, short circuit—which is detected by the level sensor. The level sensor transmits a disconnect command to immediately disconnect the line sections with a preferential transmission.

In the data transmission cycle following the disconnection, the level sensor produces a turn-on command, which, however, only leads to a reconnection of those disconnected line sections which are not disturbed i.e.

short-circuited. For this purpose, in addition to the connect command, the electrical values of the associated disconnected line sections, namely the resistance value of the data line with regard to a ground line and the polarity of the voltage on the data line to an energy line are evaluated in the overload switches and joined with the connected command. Then only the undisturbed line sections are reconnected, while the disturbed line sections remain disconnected and while the central core system with the level sensor 30 and the participator 24 always remains in operation.

Figure 3:
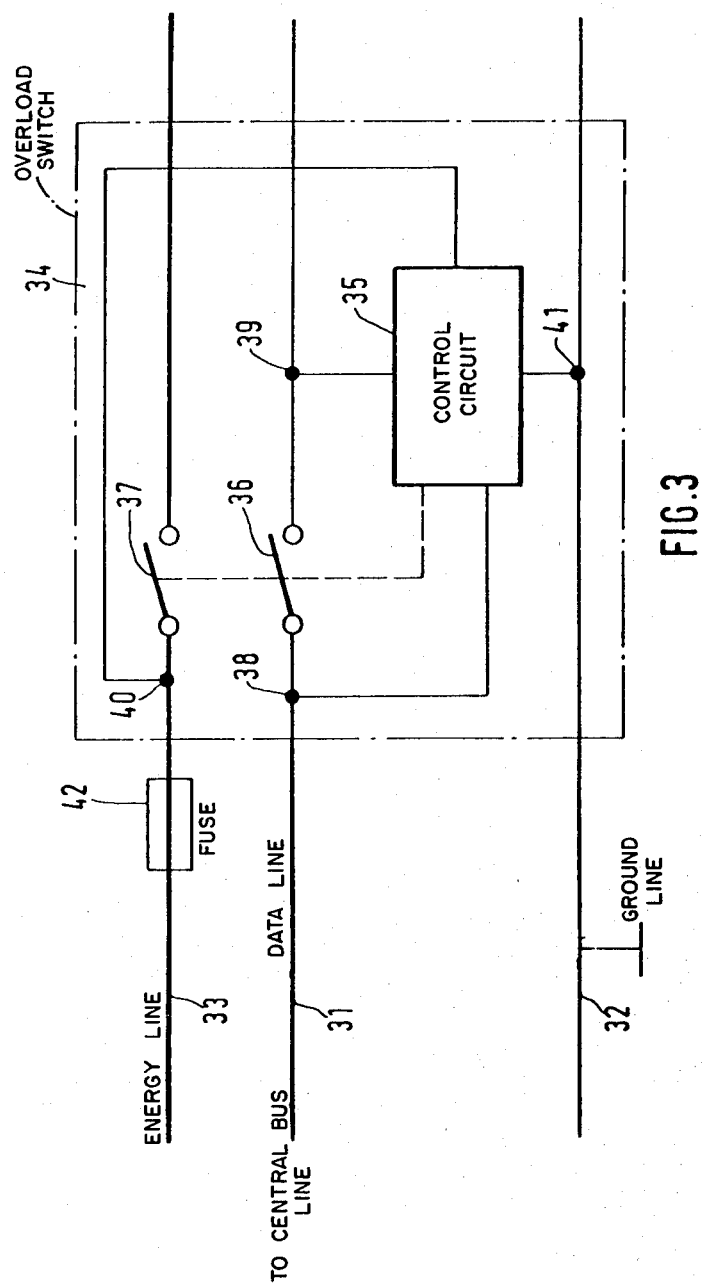
FIG. 3 is a diagrammatic circuit arrangement of an overload switch in a bus line.

An arrangement of an overload switch in a bus line consisting of a data line 31, a ground line 32 and an energy line 33 is illustrated in FIG. 3. The overload switch 34 is shown within a broken line. It includes a control circuit arrangement 35 with a logic circuit arrangement, as well as a switch 36 in the data line and a switch 37 in the energy line which is connected to the left side with a batter (not shown). On the left side in FIG. 3 is found the central bus line (not shown), from which the data line 31 branches off.

To transmit the connect command to the control circuit arrangement said arrangement is connected via a terminal 38 with the data line which is connected with the level sensor. To evaluate the electrical values of the line sections which are connectable and disconnectable, on the right side in FIG. 3 the control circuit arrangement is connected with a terminal 39 on the data line of the disconnectable line section. In addition, there is a connection between the control circuit arrangement and a terminal 40 on the energy line 33 on the side of the switch 37 facing the battery.

If a short circuit from the data line 31 to the ground line 32 or to the energy line 33 occurs, the control circuit arrangement receives a disconnect command from the level sensor through the data line 31, which command results in the opening of the previously closed switches 36 and 37.

When a connect command appears in the succeeding data transmission cycle through the data line 31 and the terminal 38 the control circuit arrangement does not immediately close the switches 36 and 37, but rather first evaluates the electrical values of the disconnected line section. For this purpose, a resistor between the terminal 39 and the terminal 41 on the ground line is evaluated, which resistor only forms a control signal to reconnect in conjunction with the connect command when a certain resistance value is exceeded. In addition, the requirement is taken advantage of and used, that in undisturbed operation, the potential on the energy line is always more positive than the potential on the data line. If such a voltage is not detected between the terminal 40 and the data line, the control circuit arrangement does not form a control signal which, in conjunction with the connect command joined with the control signal in a logic circuit, forms a turn-on signal for the switches 36 and 37. The control circuit arrangement thus cannot detect any malfunction, either by a short circuit to the ground line or to the energy line, in order to reconnect the disconnected line section. In contrast to the arrangement according to FIG. 3, even the energy line is protected against short circuits, in that it can be disconnected with the switch 37. If, for further safety, a safety device 42 is arranged in the energy line, it can be placed between the overload switch 34 and the battery (not shown), so that the overload switch remains functional even when there is a short circuit from the energy line to the ground.

Figure 4:
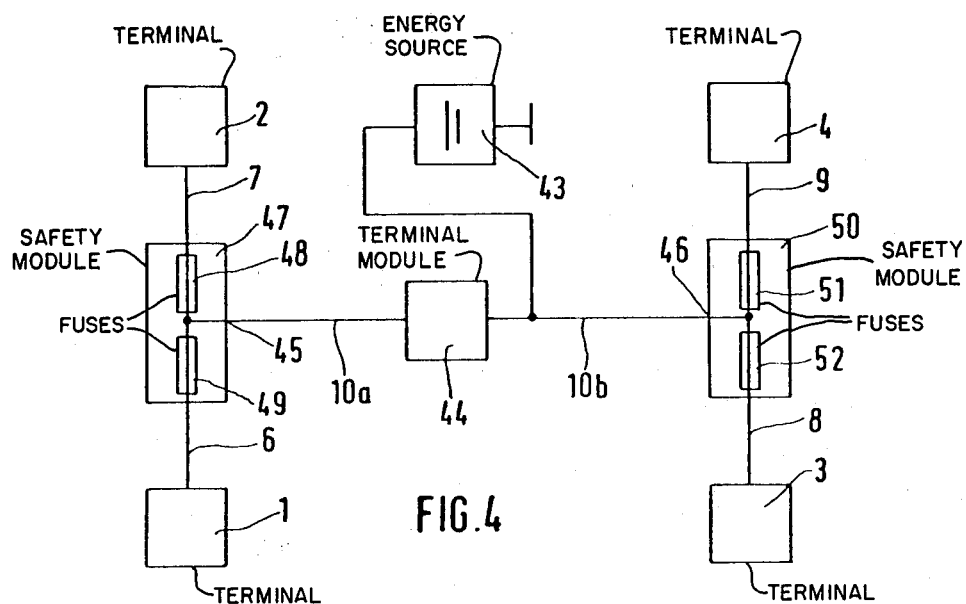
FIG. 4 is a diagrammatic circuit arrangement with a protected central bus line.

In the arrangement illustrated in FIG. 4, two sections of a central bus line of a bus system are designated by numerals 10a and 10b. An energy source 43 in the form of a battery is connected to the central bus line, namely to the section 10b. The central bus line also includes a central participator module 44.

Two lines of the bus system branch off from each end 45 and 46 of the central bus line. The lines connected with the end 45 are designated as 6 and 7, and the lines connected with the end 46 have reference numerals 8 and 9. Each line leads to at least one participator module 1-4.

The lines 6 and 7 are connected with the end 45 of the central bus line by means of a first safety module 47. Safety devices 48 and 49 in the safety module indicate that each line 6 and 7 is individually protected relative to section 10a of the central bus line in the safety module.

In an equivalent manner, the lines 8 and 9 are connected to the end 46 of the central bus line by means of a second safety module 50 with safety devices 51 and 52.

This arrangement has the effect that in the case of a short circuit in one of the lines 6,7,8 or 9, the respective line is separated from the other lines and from the central bus line by one of the safety devices 48, 49, 51 or 52, so that a short circuit remains limited to the respective disturbed line. However, a disturbance by short circuit of section 10a of the central bus line will also extend to lines 6 and 7, and similarly a short circuit in the section 10b will extend to the lines 8 and 9.

Figure 5:
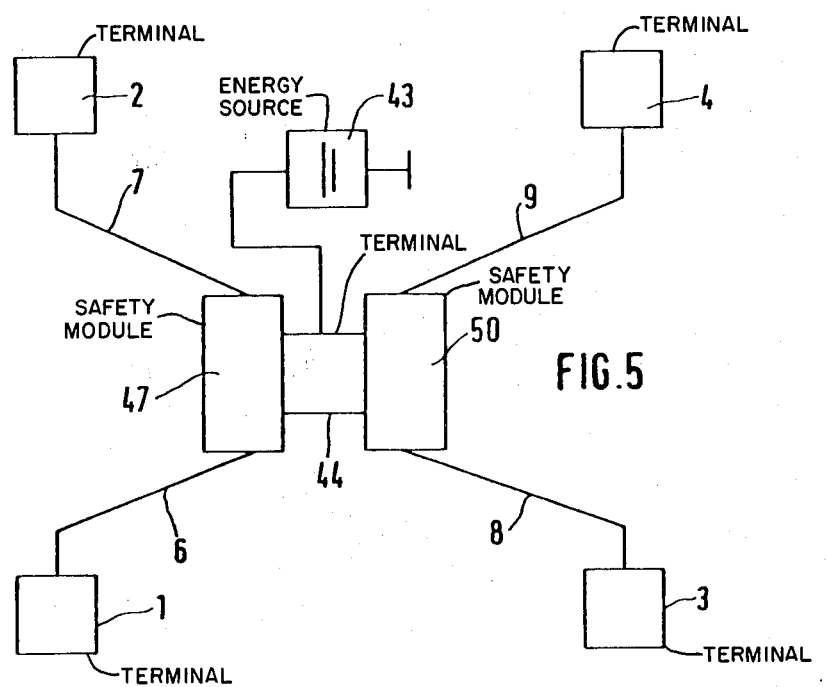
FIG. 5 is a diagrammatic circuit arrangement with a central participator module.

The preceding limitation of the effectiveness of the protection in the arrangement according to FIG. 4 is avoided by the arrangement according to FIG. 5.

In this configuration of a bus system, instead of a central bus line as central portion as in FIG. 4, the safety modules 47 and 50 form a unit with the central participator module 44, so that sections of a central bus line between the safety modules and the central participator module are eliminated. The energy source 43 here is directly connected to the central participator.

In the configuration according to FIG. 5, every short circuit disturbance occurring in one of the lines 6 through 9 is limited to that line. Because no central bus line is present, no disturbances of such a central bus line can affect the lines.

The safety modules can cooperate with a level sensor to detect level fluctuations on a data line, in the central bus line or in the central participator. The level sensor is thereby connected to the bus system as a further participator. Each of the lines 6 through 9 can be centrally disconnected by the level sensor in any data transmission cycle by means of an overload switch formed as a participator in one of the safety modules having a control circuit arrangement, and can be reconnected in accordance with a turn-on command transmitted by the level sensor in a following data transmission cycle as well as electrical values of the respective line which are evaluated in the control circuit arrangement.

Of particular significance, a control circuit arrangement is arranged in the overload switch to measure resistance between the data line and a ground line to form a control signal. The control signal and the turn-on command can be joined in a logic circuit arrangement to form a turn-on signal which reconnects the line. In addition the control circuit arrangement of the overload switch can also be formed to evaluate the polarity of the voltage on the data line of the line which is disconnectable by the overload switch, with reference to an energy line to produce a control signal in dependence on the polarity. This control signal can be joined with the turn-on command of the level sensor in the logic circuit arrangement to form a turn-on signal.

Furthermore, a safety device can be provided in the energy line on the side of the overload switch connected with the energy source.

What is claimed is:

1. An arrangement for time division multiplex data transmission through a bus system which includes a bus line and a plurality of terminals connected to the bus line in a predetermined succession and in a predetermined combination, in which each terminal establishes a data transmitting connection to the bus line and means connected in the bus system for detecting short circuits and shutting down individual sections of the bus line to protect the individual sections without shutting down all sections, including safety devices respectively connecting the terminals to the individual sections of the bus line, and an energy source connected to the bus line at point of common connection to said safety devices.

2. An arrangement as claimed in claim 1 wherein the bus line includes a central terminal having at least one safety module directly connected therewith, and an energy source directly connected to the central terminal.

* * * * *